United States Patent
Ravindran et al.

(10) Patent No.: US 9,313,030 B2
(45) Date of Patent: Apr. 12, 2016

(54) METHOD AND APPARATUS FOR SECURE AD HOC GROUP DEVICE-TO-DEVICE COMMUNICATION IN INFORMATION-CENTRIC NETWORK

(71) Applicant: Futurewei Technologies Inc., Plano, TX (US)

(72) Inventors: Ravishankar Ravindran, San Ramon, CA (US); Xinwen Zhang, San Jose, CA (US); Guo-Qiang Wang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/161,458

(22) Filed: Jan. 22, 2014

(65) Prior Publication Data

US 2015/0207633 A1 Jul. 23, 2015

(51) Int. Cl.
*H04L 29/06* (2006.01)
*H04L 9/32* (2006.01)

(52) U.S. Cl.
CPC ............ *H04L 9/3247* (2013.01); *H04L 9/3271* (2013.01); *H04L 63/00* (2013.01)

(58) Field of Classification Search
CPC .............. H04L 9/3247; H04L 2209/24; H04L 2209/72; H04L 63/0428; H04L 67/28; H04L 65/103
See application file for complete search history.

(56) References Cited

U.S. PATENT DOCUMENTS

| | | | |
|---|---|---|---|
| 2004/0267876 A1* | 12/2004 | Kakivaya | H04L 67/16 709/200 |
| 2007/0195760 A1 | 8/2007 | Rahman et al. | |
| 2009/0016524 A1 | 1/2009 | Park et al. | |
| 2013/0282860 A1 | 10/2013 | Zhang et al. | |
| 2014/0119544 A1* | 5/2014 | Lee | 380/270 |

FOREIGN PATENT DOCUMENTS

WO   WO 2013/118096 A1   8/2013

OTHER PUBLICATIONS

"Key encapsulation", Wikipedia, Feb. 22, 2014, 2 pages.
"Replay attack", Wikipedia, Jun. 16, 2015, 2 pages.
Florina Almenarez, et al., "SPDP: A Secure Service Discovery Protocol for Ad-Hoc Networks", Dept. of Telematic Engineering, University of Carlos III of Madrid Avda, 2003, 8 pages.
Trisha Biswas, et al., "Contextualized Information-Centric Home Network", North Carolina State University, SIGCOMM '13, Aug. 12-16, 2013, 2 pages.

* cited by examiner

*Primary Examiner* — Izunna Okeke
(74) *Attorney, Agent, or Firm* — Futurewei Technologies, Inc.

(57) ABSTRACT

Various disclosed embodiments include methods, devices and systems establishing secure discovery and secure communication in an ad hoc information-centric network (ICN). An application in a consumer device sends a discovery interest including an associated service name or prefix encrypted by an encryption key using the ICN. A producer device publishing and discovery protocol (SPDP) on an ICN stack of the producer device receives the discovery interest and verifies the consumer device using the encryption key. The producer device SPDP returns a data protocol data unit (PDU) to the consumer device configured to enable the consumer device to access the published service, and the consumer device establishes routing with the producer device and receives the local published service.

26 Claims, 5 Drawing Sheets

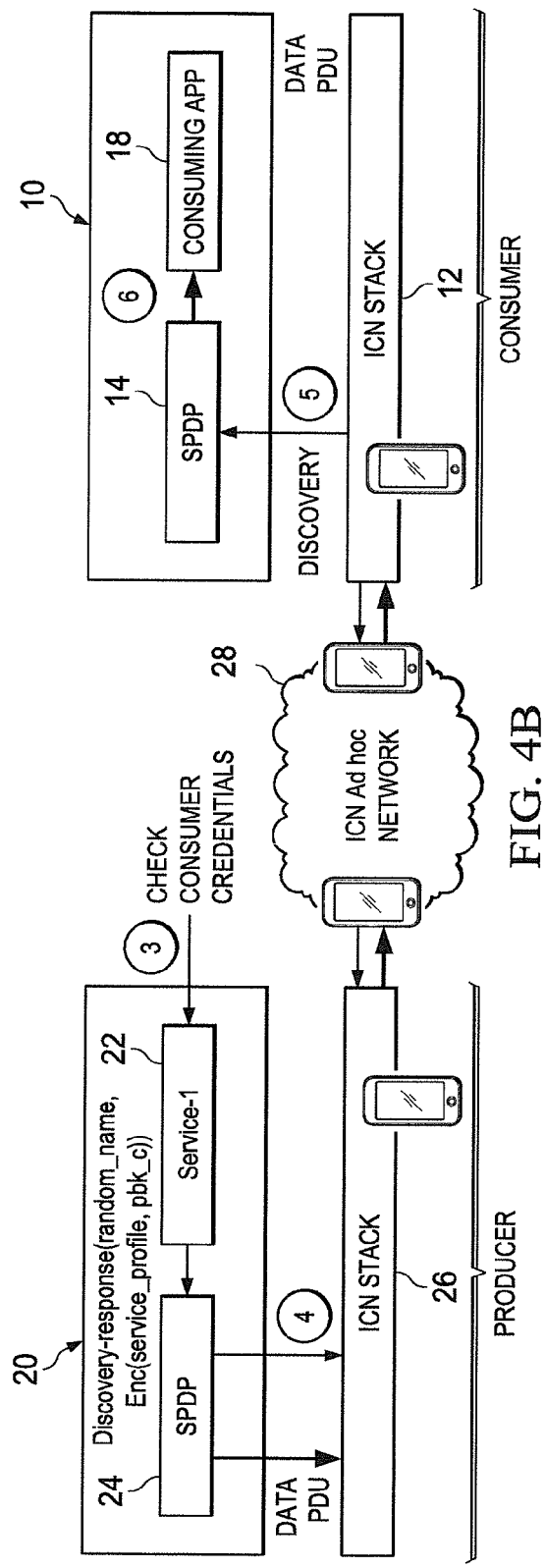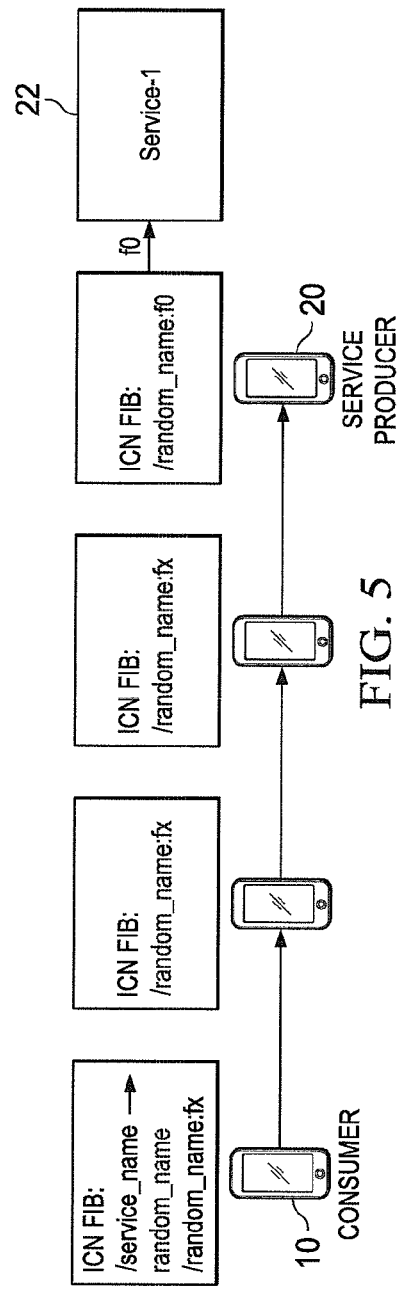
FIG. 4B
FIG. 5

US 9,313,030 B2

METHOD AND APPARATUS FOR SECURE AD HOC GROUP DEVICE-TO-DEVICE COMMUNICATION IN INFORMATION-CENTRIC NETWORK

TECHNICAL FIELD

The present disclosure relates generally to an Information-centric Network (ICN), and more specifically to Ad hoc group device-to-device communication in ICN.

BACKGROUND

The ICN is currently well suited to enable customers and service producers to discover and exchange information, such as information in an ad hoc device-to-device (D2D) scenario. However, there is currently no solution to enable both a secure discovery of information, and a secure information exchange between devices on-demand. Zero-config like protocols do not consider ad hoc group security at all. Many discovery protocols are in the application (app) level, e.g., web services discovery, and not in an ad hoc network environment.

There is desired a system and methodology enabling both a secure discovery of information in ICN, and a secure information exchange between devices on-demand.

SUMMARY

The present disclosure provides a method, device and system configured to establish secure discovery and secure communication in an ad hoc information-centric network (ICN). In one embodiment of the disclosure, a method comprises an application in a consumer device sending a discovery interest including an associated service name or prefix encrypted by an encryption key using the ICN. A producer device publishing and discovery protocol (SPDP) on an ICN stack of the producer device receives the discovery interest from the ICN and checks to see if there is a local published service that matches the service name or prefix in the discovery interest, and if so, verifies the consumer device using the encryption key. The producer device SPDP returns a data protocol data unit (PDU) to the consumer device configured to enable the consumer device to access the published service, and the consumer device establishes routing with the producer device and receives the local published service.

In another embodiment, a producer device is configured to enable the methodology.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIGS. 4A and 4B illustrate a block diagram of secure service discovery;

FIG. 5 illustrates a block diagram of secure binding of a consumer and producer;

DETAILED DESCRIPTION

The present disclosure provides a system and methodology enabling both a secure discovery of information in an ICN, and a secure information exchange between devices on-demand in an ad hoc ICN scenario.

Figure 1:
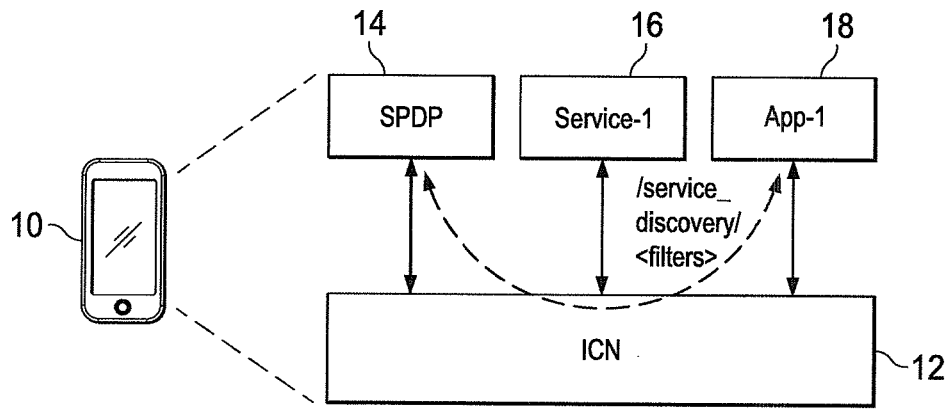
FIG. 1 illustrates a block diagram of an ICN stack on a device.

Referring to FIG. 1, the present disclosure assumes a service publishing and a discovery utility, such as a service publishing discovery protocol (SPDP) for service discovery, is available on a device. Services are named and associated with policy requirements, e.g., which user or group can access a service. Routing is a result of service discovery. Each service that is discoverable to others has an identity credential. Without loss of generality, it is assumed that the identity credential is a public key (pbk) and private key (prk) pair (pbk/prk), and the pbk is certified by some trust management mechanism such as an enterprise PKI. There is a common certificate authority (CA) for devices or services, e.g., an enterprise CA, and the CA's public key certificate is pre-installed on each device.

Figure 2:
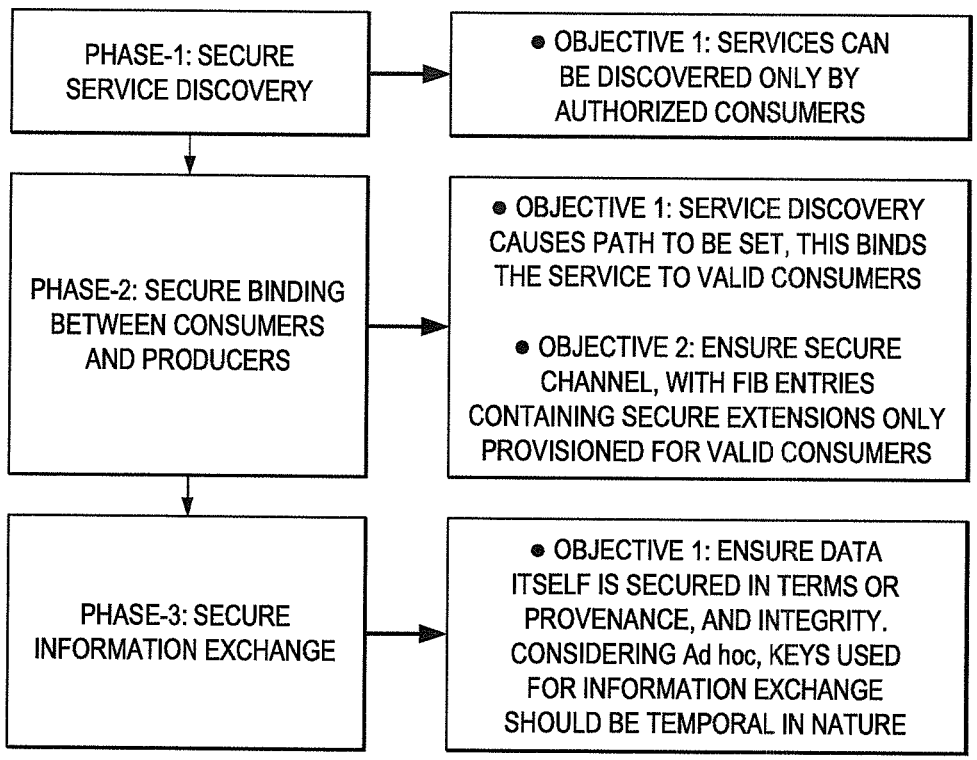
FIG. 2 illustrates 3 steps/phases to enable secure information exchange.

The present disclosure provides three steps/phases to enable the secure information exchange, as shown in FIG. 2. Phase 1 is the secure service discovery whereby services can be discovered only by authorized consumers. Phase 2 secures binding between customers and producers, whereby service discovery causes a path to be set and binds the service to valid consumers. Phase 3 secures information exchange, and ensures the data itself is secured in terms or provenance, and integrity. Considering ad hoc, keys used for information exchange should be temporal in nature.

Figure 3:
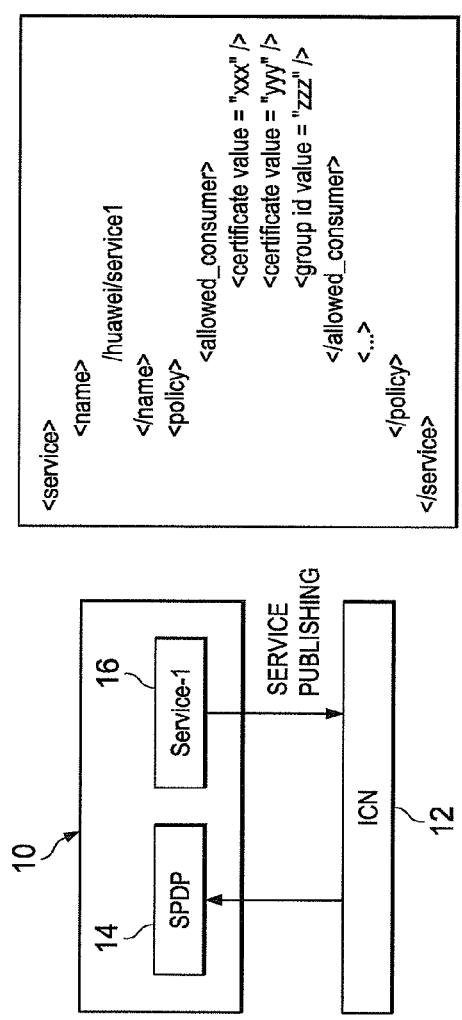
FIG. 3 illustrates a block diagram of Phase-0 service publishing.

Referring to FIG. 3, the service publishing protocol is similar as before, with the addition of new fields in the service profile:

The field <allowed_consumer> specifies a set of consumers or a group that is authorized to discovery and consume the service.

Multiple types of consumer IDs can be supported, e.g.:

xxx=Hash(pbk_c), where pbk_c is the public key certificate associated with individual service/user/device;

yyy=Hash(pbk_ca), where pubk_ca is the public key of a CA, e.g., a company's enterprise CA;

zzz=certified group id, user id, etc.

During the phase 1 secure service discovery, it is assumed that the service on a set of devices is affiliated to the same organization. In a general case, the device itself may not be trusted. The service can be a general network service or application, where users have pre-trust, e.g., a social application where the users are in each other's contact list.

With pre-known information (configured as part of the service), the services installed over the devices have a mechanism to validate credentials of each other, which can be dependent or independent of the device itself. For instance, a service discovery mechanism is disclosed in commonly assigned U.S. patent application Ser. No. 13/658,299, entitled "Name-Based Neighbor Discovery and Milti-Hop Service Discovery in Information-Centric Networks", the teachings of which are included herein in their entirety by reference. The credential, such as a public key certificate, can be verified via a trust management mechanism, e.g., a PKI. Each service has the common CA's public key certificate (pbk_ca), such that it can verify the signature (sig) signed from another service in an off-line manner. This can be setup during installation time of the service, or by IT admin of the device.

Figure 4A:
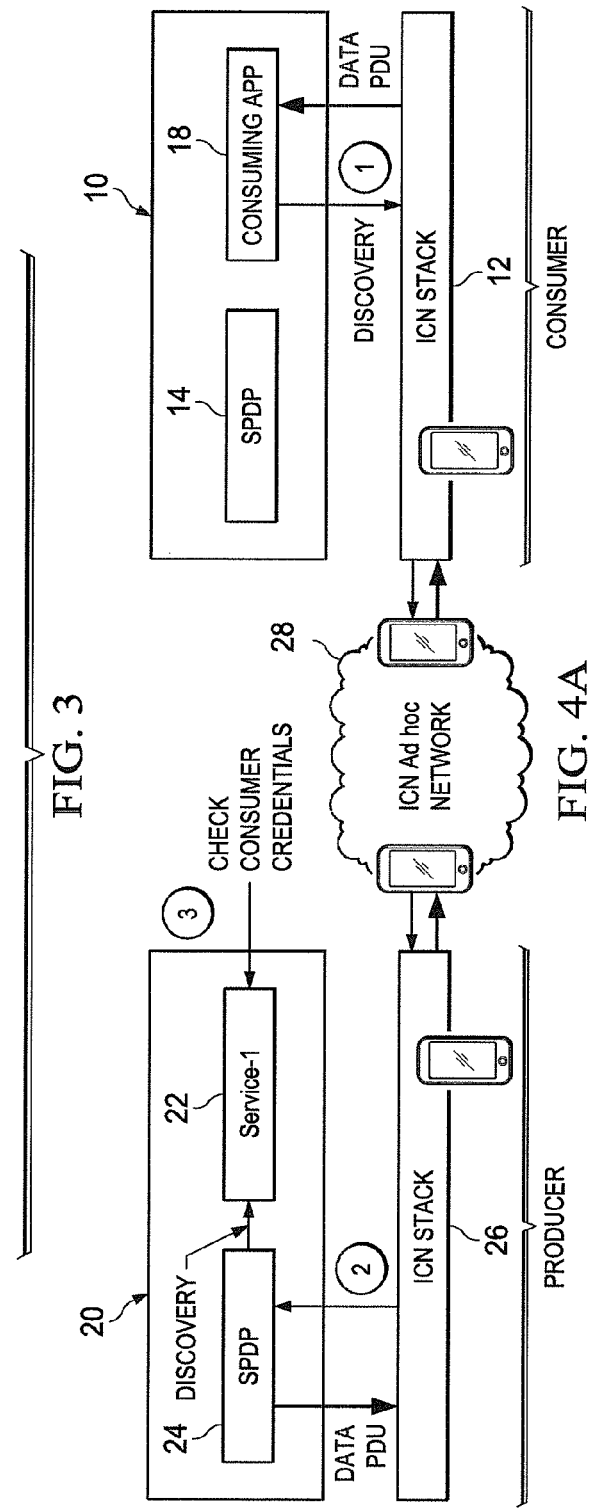

Phase 1, Secure Service Discovery:

Referring to FIGS. 4A and 4B, there is shown a preferred embodiment for secure service discovery.

1.1. An application (app) on a consumer device sends an interest <service_discovery, pbk_c, timestamp or token, sig>, where:

pbk_c is the public key of the consumer app;

The interest protocol data unit (PDU) on the consumer device is signed by prk_c;

A timestamp or session token can be used to prevent replay attack in the discovery protocol (http://en.wikipedia.org/wiki/Replay attack); and A name-prefix can be included optionally and for filtering purposes, such as disclosed in the previously identified commonly assigned patent application.

1.2. The interest is received and forwarded to a local service SPDP by the ICN in a remote node.

1.3. The discovery protocol reaches the SPDP on service producer ICN stack, such as disclosed in the previously identified commonly assigned patent application.

1.4. The SPDP in the service producer checks if there is local published service that matches the name or prefix in the discovery interest.

1.5. If so, the SPDP verifies the sig with pbk_c, and verifies pbk_c with pbk_ca, where pbk_ca is the public key of the CA.

1.6. If both verifications pass, the SPDP returns a data PDU <random_name, Enc(service_profile, pbk_c))>, where: random_name is a pseduo-random name generated by the producer, time-to-live (TTL) can also be associated with this entity; service_profile is the matched local published service, which includes the real service name;

The service_profile is encrypted by the pbk_c. There are different ways of encrypting a data with a public key, e.g., http://en.wikipedia.org/wiki/Key_encapsulation If the verification fails, then no service-response is generated, or a service-discovery could include a n-ack that gives the consumer an indication of the failure.

1.7. Follow the original discovery protocol, this service-response data PDU is returned to the consumer. The routing path is also set between the consumer and the service producer, such as described in the previously identified commonly assigned patent application, with the random_name as the name/prefix in FIB entries.

1.8. The producer SPDP maintains a list of (service_name < - - - > random_name) mapping in its local database. Each service on local device can read the random_name of its published service_name.

1.9. When a new discovery interest is received by the SPDP for the same service name, the SPDP first checks if there is a random_name for the service_profile available, if so it uses the random_name in the return data PDU, instead of generating a new random_name for the same service_profile.

Phase 2, Secure Binding of Consumer and Producer:

Referring to FIG. 5, after the secure discovery phase, the ICN stack and all intermediate nodes have setup forwarding information base (FIB) entries to reach the producer from the consumer, with the random_name as entries, such as described in the previously identified commonly assigned patent application.

Advantageously, this prevents unauthorized consumers from retrieving the random_name and send an interest later.

2.1. After receiving data PDU <random_name, Enc(service_profile, pbk_c))>, the consumer app decrypts with prk_c, gets the service_profile and service_name, and maintains a map of (service_name < - - - > random_name).

Phase 3, Secure D2D Communication:

After the discovery and binding phases, both the producer and the consumer have a valid mapping of (service_name < - - - > random_name). All intermediate nodes have random_name in their FIBs. The ICN network knows nothing about service_name since the service_profile is encrypted in the discovery phase.

3.1. The app in the consumer side sends interest <random_name, pbk_c, sig> to communicate with the producer service, where the sig is a signature generated with prk_c.

3.2. The interest is routed to the service app in producer, following the ICN protocols.

3.3. The service app checks local (service_name < - - - > random_name) mapping, and obtains the corresponding service_name.

3.4. The service app then generates the data payload, as usual application functions, and returns the data PDU <random_name, Enc(payload, pbk_c))>. Optionally, before it returns the data PDU, the service app checks its local security policy if pbk_c is allowed to receive its data. Again, there can be many ways for using pbk_c to encrypt the data payload, e.g., http://en.wikipedia.org/wiki/Key_encapsulation.

3.5. The PDU returns to the consumer app, following basic ICN protocols.

3.6. The app decrypts the data payload with prk_c, and obtains the corresponding service_name with random_name in its local mapping.

3.7. The app consumes data <service_name, payload>.

Figure 6:
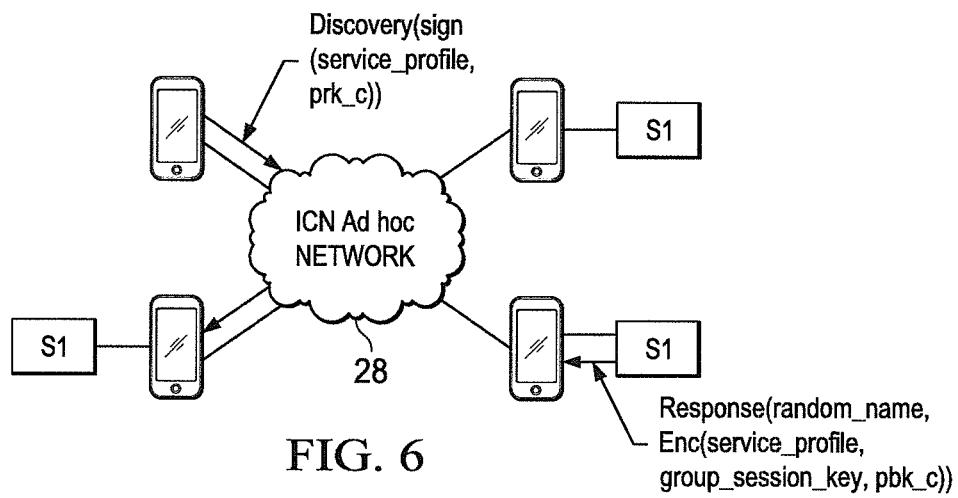
FIG. 6 illustrates a block diagram of a secure group communication.

Phase 3: Secure Group Communication:

Referring now to FIG. 6:

1.1 For a group communication case:

1.2 Each consumer follows the same secure discovery protocol to discover the service_profile.

1.3 During the secure discovery protocol, the service producer SPDP first generates a symmetric group_session_key, and returns the data PDU <random_name, Enc(service_profile, group_session_key, pbk_c))>, where:

random_name is a pseudo-random name generated by the producer;

service_profile is the matched local published service, which includes the real service name;

Group_session_key is a symmetric key (e.g., AES) for the group; and options may be available for using pbk_c to encrypt the service_profile and group_session_key.

1.4 In Step 2.1, after receiving the data PDU <random_name, Enc(service_profile, group_session_key, pbk_c))>, the consumer app decrypts the data PDU with prk_c, and gets the service_profile and service_name. It then maintains a map of (service_name < - - - > random_name < - - - > group_session_key).

1.5 As in the previous case, the random_name is used to bind the service and its consumers. When another group member (say consumer 2 with pbk_c2) discovers the same service name, the producer SPDP checks if there is local (service_name < - - - > random_name < - - - > group_session_key). If so, it returns the data PDU <random_name, Enc(service_profile, group_session_key, pbk_c2)). The consumer 2 app decrypts the data PDU with prk_c2 and obtains the service profile and the service name, similar to the first consumer. This way, multiple interactive applications agree on the same random-name and group key. The same group key encrypted content can be cached in the network, and can use multicasting.

1.6. The app in consumer side sends the interest <random_name> to communicate with the producer service.

1.7. The interest is routed to the service app in producer, following ICN protocols.

1.8. The service app checks local <service_name, random_name>, and obtains the corresponding service_name.

1.9. The service app then generates the data payload, as usual application functions, and returns the data PDU <random_name, Enc(payload, group_session_key)>

Optionally, before returning the data PDU, the service checks its local security policy if pbk_c is allowed to receive its data.

Again, there can be many ways for using pbk_c to encrypt the data payload, e.g., http://en.wikipedia.orgNiki/Key_encapsulation 1.10. The PDU returns to the consumer app, following basic ICN protocols.

1.11. The app decrypts the data payload with group_session_key, and obtains the corresponding service_name with the random_name in its local mapping.

1.12. The app consumes data <random_name, payload>.

Figure 7:
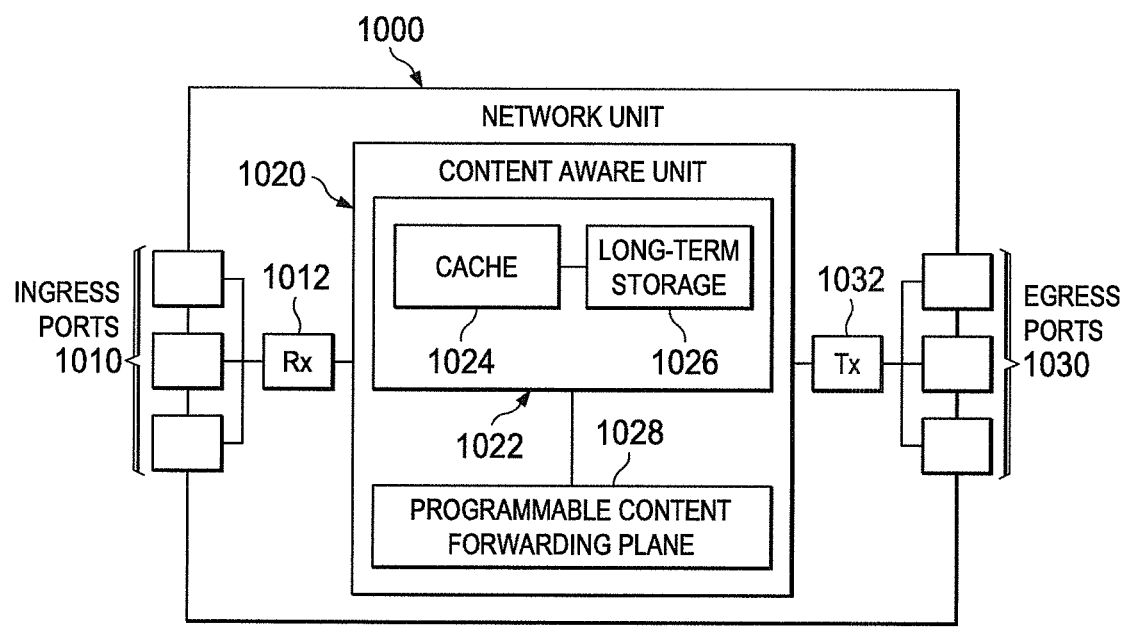
FIG. 7 illustrates an embodiment of a network unit.

FIG. 7 illustrates an embodiment of a network unit 1000, which may be any device that transports and processes data through network 100. For instance, the network unit 1000 may correspond to or may be located in any of the system nodes described above, such as a MN, PoA, content router R, and AS. The network unit 1000 may also be configured to implement or support the schemes and methods described above. The network unit 1000 may comprise one or more ingress ports or units 1010 coupled to a receiver (Rx) 1012 for receiving signals and frames/data from other network components. The network unit 1000 may comprise a content aware unit 1020 to determine which network components to send content to. The content aware unit 1020 may be implemented using hardware, software, or both. The network unit 1000 may also comprise one or more egress ports or units 1030 coupled to a transmitter (Tx) 1032 for transmitting signals and frames/data to the other network components. The receiver 1012, content aware unit 1020, and transmitter 1032 may also be configured to implement at least some of the disclosed schemes and methods above, which may be based on hardware, software, or both. The components of the network unit 1000 may be arranged as shown in FIG. 7.

The content aware unit 1020 may also comprise a programmable content forwarding plane block 1028 and one or more storage blocks 1022 that may be coupled to the programmable content forwarding plane block 1028. The programmable content forwarding plane block 1028 may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, PIT, and FIB) at the content aware unit 1020 or the network unit 1000. The programmable content forwarding plane block 1028 may interpret user requests for content and accordingly fetch content, e.g., based on meta-data and/or content name (prefix), from the network or other content routers and may store the content, e.g., temporarily, in the storage blocks 1022. The programmable content forwarding plane block 1028 may then forward the cached content to the user. The programmable content forwarding plane block 1028 may be implemented using software, hardware, or both and may operate above the IP layer or L2.

The storage blocks 1022 may comprise a cache 1024 for temporarily storing content, such as content that is requested by a subscriber. Additionally, the storage blocks 1022 may comprise a long-term storage 1026 for storing content relatively longer, such as content submitted by a publisher. For instance, the cache 1024 and the long-term storage 1026 may include Dynamic random-access memories (DRAMs), solid-state drives (SSDs), hard disks, or combinations thereof.

Figure 8:
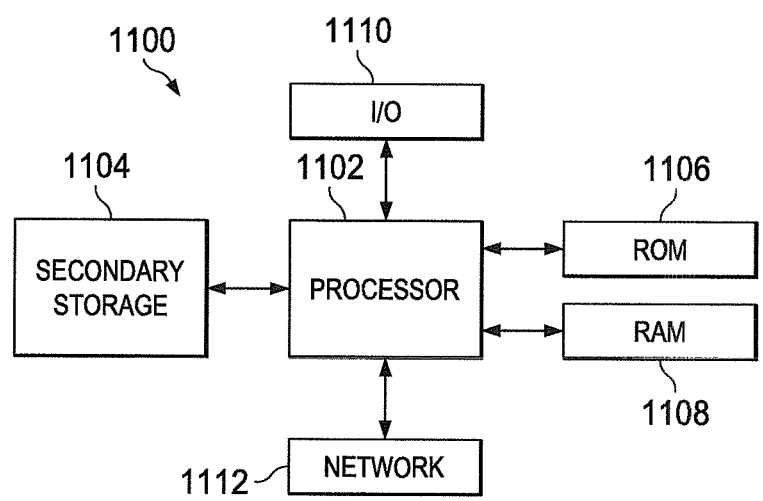
FIG. 8 illustrates a typical, general-purpose network component.

The network components described above may be implemented on any general-purpose network component, such as a computer or network component with sufficient processing power, memory resources, and network throughput capability to handle the necessary workload placed upon it. FIG. 8 illustrates a typical, general-purpose network component 1100 suitable for implementing one or more embodiments of the components disclosed herein. The network component 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips, or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of establishing secure discovery and secure communication in an ad hoc information-centric network (ICN), comprising:
   an application in a consumer device sending a discovery interest including an associated service name or prefix signed by an encryption key using the ICN;
   a producer device publishing and discovery protocol (SPDP) on an ICN stack of a producer device receiving the discovery interest from the ICN and checking to see if there is a local published service that matches the service name or prefix in the discovery interest, and if so, verifying the consumer device using the encryption key;

the producer device SPDP returning a data protocol data unit (PDU) to the consumer device configured to enable the consumer device to access the local published service; and the consumer device establishing routing with the producer device and receiving the local published service;

wherein the data PDU includes a random name, a service profile, and a public key, the random name corresponding to the service name or prefix;

wherein all intermediate nodes between the consumer device and the producer device forwarding the discovery interest and the PDU are unaware of the service name or prefix.

2. A method of establishing secure discovery and secure communication in an ad hoc information-centric network (ICN), comprising:

an application in a consumer device sending a discovery interest including an associated service name or prefix signed by an encryption key using the ICN;

a producer device publishing and discovery protocol (SPDP) on an ICN stack of a producer device receiving the discovery interest from the ICN and checking to see if there is a local published service that matches the service name or prefix in the discovery interest, and if so, verifying the consumer device using the encryption key;

the producer device SPDP returning a data protocol data unit (PDU) to the consumer device configured to enable the consumer device to access the local published service; and the consumer device establishing routing with the producer device and receiving the local published service;

wherein the data PDU includes a random name, a service profile, and a public key;

wherein the random name is a pseudo-random name generated by the producer device, and the service profile is the matched local published service including a real service name.

3. The method as specified in claim 2 wherein the producer device SPDP has a local database that maintains a list of service names mapped to pseudo-random names.

4. The method as specified in claim 3 wherein when the producer device SPDP receives a new discovery interest for the same service name, it first checks if there is a mapped random name for the service profile, and if so, includes the random name in a returned data PDU instead of generating a new random name for the same service profile, and responds by encrypting the discovery response.

5. The method as specified in claim 1 wherein the producer device ICN stack, an ICN stack of the consumer device, and intermediate nodes of the ICN have forwarding information base (FIB) entries configured to enable the consumer device to reach the producer device using the random names as entries.

6. The method as specified in claim 1 wherein upon receiving the data PDU, the consumer device application decrypts the data PDU to obtain the service profile and a service name.

7. The method as specified in claim 3 wherein the consumer device maintains a map of the service name and random name.

8. The method as specified in claim 1 wherein the consumer device application sends a service interest signed by the encryption key and including its associated random name to the producer device by ICN protocols.

9. The method as specified in claim 8 wherein the producer device checks the associated random name using local mapping, and obtains the corresponding service name.

10. The method as specified in claim 9 wherein the producer device checks its local security policy to see if the encryption key is authorized to be used to return the data PDU to the consumer device.

11. The method as specified in claim 9 wherein the producer device generates a data payload, and returns a data PDU including the data payload encrypted using the encryption key to the consumer device using ICN protocols.

12. The method as specified in claim 1 wherein the data PDU includes a group session key.

13. A method of establishing secure discovery and secure communication in an ad hoc information-centric network (ICN), comprising:

an application in a consumer device sending a discovery interest including an associated service name or prefix signed by an encryption key using the ICN;

a producer device publishing and discovery protocol (SPDP) on an ICN stack of a producer device receiving the discovery interest from the ICN and checking to see if there is a local published service that matches the service name or prefix in the discovery interest, and if so, verifying the consumer device using the encryption key;

the producer device SPDP returning a data protocol data unit (PDU) to the consumer device configured to enable the consumer device to access the local published service; and the consumer device establishing routing with the producer device and receiving the local published service;

wherein the data PDU includes a random name, a service profile, and a group session key;

wherein multiple said consumer devices send a discovery interest including an associated service name or prefix encrypted by an encryption key using the ICN, and receive and decrypt the data PDU with the group session key to obtain the same random name and service profile.

14. A producer device for establishing secure discovery and secure communication in an ad hoc information-centric network (ICN), comprising:

the producer device configured to receive a discovery interest from an application in a consumer device including an associated service name or prefix signed by an encryption key using the ICN;

the producer device including a producer device publishing and discovery protocol (SPDP) on an ICN stack configured to receive the discovery interest from the ICN and check to see if there is a local published service that matches the service name or prefix in the discovery interest, and if so, verify the consumer device using the encryption key;

the producer device SPDP configured to return a data protocol data unit (PDU) to the consumer device configured to enable the consumer device to access the local published service; and the consumer device configured to establish routing with the producer device and receive the local published service;

wherein the data PDU includes a random name, a service profile, and a public key, the random name corresponding to the service name or prefix;

wherein all intermediate nodes between the consumer device and the producer device forwarding the discovery interest and the PDU are unaware of the service name or prefix.

15. A producer device for establishing secure discovery and secure communication in an ad hoc information-centric network (ICN), comprising:

the producer device configured to receive a discovery interest from an application in a consumer device including an associated service name or prefix signed by an encryption key using the ICN;

the producer device including a producer device publishing and discovery protocol (SPDP) on an ICN stack configured to receive the discovery interest from the ICN and check to see if there is a local published service that matches the service name or prefix in the discovery interest, and if so, verify the consumer device using the encryption key;

the producer device SPDP configured to return a data protocol data unit (PDU) to the consumer device configured to enable the consumer device to access the local published service; and the consumer device configured to establish routing with the producer device and receive the local published service;

wherein the data PDU includes a random name, a service profile, and a public key;

wherein the random name is a pseudo-random name generated by the producer device, and the service profile is the matched local published service including a real service name.

16. The producer device as specified in claim 15 wherein the producer device SPDP has a local database that is configured to maintain a list of service names mapped to pseudo-random names.

17. The producer device as specified in claim 16 configured such that when the producer device SPDP receives a new discovery interest for the same service name, it first checks if there is a mapped random name for the service profile, and if so, includes the random name in a returned data PDU instead of generating a new random name for the same service profile, and responds by encrypting the discovery response.

18. The producer device as specified in claim 14 wherein the producer device ICN stack has a forwarding information base (FIB) entry configured to enable the consumer device to reach the producer device using the random names as entries.

19. The producer device as specified in claim 14 wherein the producer device is configured to enable the consumer device application upon receiving the data PDU to decrypt the data PDU to obtain the service profile and a service name.

20. The producer device as specified in claim 16 wherein the producer device is configured to enable the consumer device to maintain a map of the service name and random name.

21. The producer device as specified in claim 14 wherein the producer device is configured to receive a service interest from the consumer device application signed by the encryption key and including its associated random name to the producer device by ICN protocols.

22. The producer device as specified in claim 21 wherein the producer device is configured to check the associated random name using local mapping, and obtain the corresponding service name.

23. The producer device as specified in claim 22 wherein the producer device is configured to check its local security policy to see if the encryption key is authorized to be used to return the data PDU to the consumer device.

24. The producer device as specified in claim 22 wherein the producer device is configured to generate a data payload, and return a data PDU including the data payload encrypted using the encryption key to the consumer device using ICN protocols.

25. The producer device as specified in claim 14 wherein the data PDU includes a group session key.

26. A producer device for establishing secure discovery and secure communication in an ad hoc information-centric network (ICN), comprising:

the producer device configured to receive a discovery interest from an application in a consumer device including an associated service name or prefix signed by an encryption key using the ICN;

the producer device including a producer device publishing and discovery protocol (SPDP) on an ICN stack configured to receive the discovery interest from the ICN and check to see if there is a local published service that matches the service name or prefix in the discovery interest, and if so, verify the consumer device using the encryption key;

the producer device SPDP configured to return a data protocol data unit (PDU) to the consumer device configured to enable the consumer device to access the local published service; and the consumer device configured to establish routing with the producer device and receive the local published service;

wherein the data PDU includes a random name, a service profile, and a group session key;

wherein the producer device is configured to receive discovery interests from multiple consumer devices including an associated service name or prefix encrypted by the group session key.

* * * * *